Dec. 14, 1954  J. M. RICHARDS  2,696,757
SYSTEM OF LENSES FOR EQUAL MAGNIFICATION
Filed Dec. 8, 1949  2 Sheets-Sheet 1

INVENTOR
John M. Richards
BY
ATTORNEY

Dec. 14, 1954   J. M. RICHARDS   2,696,757
SYSTEM OF LENSES FOR EQUAL MAGNIFICATION
Filed Dec. 8, 1949   2 Sheets-Sheet 2

FIG.7

INVENTOR
John M. Richards
BY
ATTORNEY

United States Patent Office 2,696,757
Patented Dec. 14, 1954

2,696,757

SYSTEM OF LENSES FOR EQUAL MAGNIFICATION

John M. Richards, Santa Barbara, Calif.

Application December 8, 1949, Serial No. 131,770

13 Claims. (Cl. 88—54)

Eye glasses are worn to provide refractive corrections and it is a common experience for a patient to require refractive corrections that are different for each eye. In the same eye different refractive corrections are often required in different meridians. In eye glasses of the prior art, lens pairs giving different refractive corrections for the different eyes have caused different magnification of the images seen by the patient; and this difference in magnifications often causes distressing symptoms. With some patients, the symptoms resulting from the unequal magnification of the eye glasses cause more discomfort than is experienced without any refractive correction for the eyes.

It is an object of this invention to provide spectacles in which single lenses for both eyes produce the same magnification of the image seen, even though the lenses may give different refractive corrections. It is another object to provide spectacles with lenses that have different refractive power and that have different power in various meridians and segments while producing equal magnification of the image seen by the patient.

In some patients the eyes themselves are sufficiently different to magnify images unevenly. This condition, known as aniseikonia, can be corrected by spectacles designed in such a way that magnification produced by the eye and one lens of the spectacles is equal to the magnification produced by the combination of the other eye with the other lens of the glasses. Where such correction was combined with a compound refractive correction, there has been no simple method in the prior art for insuring the desired difference in magnification between the lenses without resorting to compound lens systems to meet the refractive corrections called for by the prescription in cases of aniseikonia. It may be said, therefore, that it is an object of this invention to provide spectacles that produce brain images of equal size for patients who require different refractive corrections for each eye, even though the patient suffers from aniseikonia.

Another object of the invention is to provide a method of making spectacle lenses of different refractive power and giving equal magnification in all meridians. Lenses that give equal magnification are referred to herein as "iseikonic." One feature of the invention relates to a graph with an adjustable scale for conveniently making lens prescriptions iseikonic.

Still another object of the invention is to provide a series of lenses, either partially or fully ground, which are so correlated with one another that they may be used as the opposite lenses of spectacles for refractive corrections of different power, each of the lenses giving the same magnification in all meridians, and the powers of successive lenses of the series being separated from one another by small steps so as to closely approximate the refractive correction indicated by the clinical tests.

Other objects, features and advantages of the invention will appear or be pointed out as the description proceeds.

In the drawing, forming a part hereof, in which like reference characters indicate corresponding parts in all the views.

In explaining this invention, it is necessary to give certain relations of values in formulae, and these formulae can be most conveniently used by having the factors listed at the beginning of the description. All of the factors are listed below.

SYMBOLS DEFINITION $h$ is the intended distance in meters from the vertex of the lens to the center of rotation of the eye.

$n$ equals index of refraction.

M is the angular magnification ratio of the image to the object.

$d$ is the reduced lens thickness (axial) and equals the actual thickness ($t$) divided by the index of refraction ($n$) of the lens—I use 1.5 for approximate purposes here.

$q$ is the lens diameter.

$tm$ is the minimal essential axial lens thickness necessary to provide a lens of a given diameter ($q$) for a given maximum lens power (D$xt$) and rear surface curve (D2$xt$).

D$a$ is any dioptric lens power.

D$xt$ is the most plus dioptric lens power of all meridians being considered.

D$nt$ is the least plus dioptric lens power of all meridians being considered.

D$c$ is the median dioptric lens power of all the meridians being considered.

D$x$ is the most plus dioptric lens power of all the meridians of a given lens prescription.

D$n$ is the less plus dioptric lens power of the lens which contains the most plus dioptric meridian for a given consideration.

D'$x$ is the more plus dioptric lens power of the lens of the eye opposite that of the most plus meridian of a given lens prescription.

D'$n$ is the less plus dioptric lens power of the lens of the eye opposite that of the most plus meridian lens of a given lens prescription.

D$ya$ is any dioptric meridional difference of all the meridians being considered.

+D$ya$ is any plus dioptric meridional difference measured from the least plus dioptric power considered.

−D$ya$ is any minus dioptric meridional difference measured from the most plus dioptric power considered.

D$yt$ is the maximum dioptric difference between the most plus and the least plus dioptric meridians being considered.

+D$yx$ is the dioptric difference between the most plus dioptric meridian of a given lens prescription and the least plus dioptric value of a given iseikonic lens set.

−D$yx$ is the dioptric difference between the most plus dioptric meridian of a given lens prescription and the most plus dioptric value of a given iseikonic lens set.

+D$yn$ is the dioptric difference between the less plus dioptric meridian of the lens of the most plus dioptric meridian of the given spectacle lens prescription and the least plus dioptric value of a given lens set.

−D$yn$ is the dioptric difference between the less plus dioptric meridian of the lens of the most plus dioptric meridian of a given spectacle lens prescription and the most plus dioptric value of a given lens set.

+D'$yx$ is the dioptric difference between the more plus dioptric value of the lens of the eye opposite the most plus dioptric meridian of the given spectacle lens prescription, and the least plus dioptric value of a given lens set.

−D'$yx$ is the dioptric difference between the more plus dioptric value of the lens of the eye opposite the most plus dioptric meridian of the given spectacle lens prescription and the most plus dioptric value of a given lens set.

$+D'yn$ is the dioptric difference between the less plus dioptric meridian value of the lens of the eye opposite the most plus dioptric meridian of the given spectacle lens prescription, and the least plus dioptric value of a given lens set.

$-D'yn$ is the dioptric difference between the less plus dioptric meridian value of the lens of the eye opposite the most plus dioptric meridian of the given spectacle lens prescription, and the most plus dioptric value of a given lens set.

$D2a$ is any rear surface lens curve in diopters.

$D2xt$ is the rear surface lens curve of the lens power $Dxt$.

$D2nt$ is the rear surface curve of the lens for the power $Dnt$.

$D2x$ is the rear surface lens curve for the lens power $Dx$.

$D2n$ is the rear surface lens curve for the lens power $Dn$.

$D'2x$ is the rear surface lens curve for the lens power $D'x$.

$D'2n$ is the rear surface lens curve for the lens power $D'n$.

$+D2ya$ is the difference in dioptric power between the rear surface curves of any dioptric power meridian, and the least plus dioptric meridian rear surface curve.

$-D2ya$ is the difference in dioptric power between the rear surface curves of any dioptric power meridian, and the most plus dioptric meridian rear surface curve.

$+$ or $-D2yt$ is the difference in dioptric power between the rear surface curves of the most plus dioptric meridian and the least plus dioptric meridian of a given lens set.

$+D2yx$ is the difference in dioptric power between the rear surface curve of the most plus dioptric meridian ($D2x$) of a given lens prescription and the surface curve $D2nt$.

$-D2yx$ is the difference in dioptric power between the rear surface curve of the most plus dioptric meridian of a given lens prescription and the rear surface curve $D2xt$.

$+D2yn$ is the difference in dioptric power between the rear surface curve $D2n$ and the rear surface curve $D2nt$.

$-D2yn$ is the difference in dioptric power between the rear surface curve $D2n$ and the rear surface curve $D2xt$.

$+D'2yx$ is the difference in dioptric power between the rear surface $D'2x$ and $D2nt$.

$-D'2yx$ is the difference in dioptric power between the rear surface curves $D'2x$ and $D2xt$.

$+D'2yn$ is the difference in dioptric power between the rear surface curves $D'2n$ and $D2nt$.

$-D'2yn$ is the difference in dioptric power between the rear surface curves $D'2N$ and $D2xt$.

$S$ is a complex factor comprised of $(d+Mh)/(d)$.

$R$ is the ratio of $M$ divided by $d$, $(R=M/d)$.

$D1a$ is any front surface lens curve in diopters.

$D1xt$ is the front surface lens curve for the lens power $Dxt$.

$D1nt$ is the front surface lens curve for the power $Dnt$.

$D1x$ is the front surface lens curve for the power $Dx$.

$D1n$ is the front surface lens curve for the power $Dn$.

$D'1x$ is the front surface lens curve for the power $D'x$.

$D'1n$ is the front surface lens curve for the power $D'n$.

B–F is the symbol implying consideration of Best-Form lens curve values for $D2a$ and $D1a$ to provide the least possible astigmatism from oblique pencils of light through the peripheral parts of a lens.

$Ka$ is the term showing the difference between $Da$ and $D2a$ ($Ka=Da-D2A$).

$Kxt$: $Kxt=(Dxt-D2xt)$.

$G$ is the dioptric power range of an iseikonic lens series defined by the range between either:
1. The least plus value of the iseikonic lens set with the least plus values, and the least plus value of the lens set with the most plus dioptric power values, or
2. The most plus value of the lens set with the least plus values, and the most plus value of the lens set with the most plus dioptric power values.

$A$ is the medium iseikonic lens set dioptric separation from the adjacent lens set median value.

$E$ is the number of subdivisions needed for each diopter of a lens set, or series.

The magnification ($M$) produced by a lens depends upon the distance of the object ($u$); the dioptric lens power ($Da$); the curve of the front or rear surface of the lens; the lens thickness factor ($d$); and the vertex distance from the center of rotation of the eye ($h$). The reduced lens thickness factor is given by the equation $d=tm/n$, where $tm$ represents the minimal essential axial lens thickness necessary to provide a lens of a given diameter ($q$) for a given maximum lens power ($Dxt$) and rear surface curve ($D2xt$); and $n$ represents the index of refraction of the material of which the lens is made.

It will be understood that the magnification can be expressed in terms of either front surface lens curve or rear surface lens curve, but for purposes of illustration I have selected rear surface lens curve.

The magnification is given by the equation $$M=(1+d(DA-D2a))/(1-hDa).$$

It is advantageous to add Best Form (B–F) lens curve considerations for peripheral lens function.

*Iseikonic lens pair*

For a given iseikonic lens pair, that is, lenses that are to be used for different eyes in spectacles supplied to a patient, the factors to consider are an elaboration of the factors considered for magnification. These include M, $Da$, $D2a$, $h$, $d$, $q$, $S$, $Dxt$, $Dnt$, $Dx$, $Dn$, $D'x$, $D'n$, $D2xt$, $D2nt$ and (B–F).

In consideration of these factors for an iseikonic lens pair:

M must be equal in all meridians in both eyes in order to balance the magnification of any different refractive power meridians.

$h$ is given by the "fitting" measurements.

$q$ is given by the "fitting" measurements.

$Dxt$ is identical with the dioptric value, $Dx$.

$Dnt$ is the less plus of either $Dn$ or $D'n$ dioptric values which is part of the dioptric spectacle lens pair.

$Da$ are comprised by $Dxt$, $Dnt$, $Dx$, $Dn$, $D'x$, $D'n$ of the four possibly different meridian powers in the lens pair. (Axis is no consideration here.)

$D2a$ is the rear surface curve of any of the $Da$ values, and all are to be solved, except $D2xt$ or $D2nt$, one of which must be chosen.

R is the ratio of the magnification to factor ($d$), and that is $R=(M/d)$ which is in turn equal to $(S-1)/(h)$.

*Variations of chosen factor values*

Various combinations of the chosen factors may be used, and these factors may be made variable or given a constant value. For example, in choosing the factor S:

1. S may be a variable value determined by the minimum $d$ for a given lens diameter and dioptric power range ($Dyt$).
2. S may be a constant value designed to provide a useful $Dyt$ value for a given dioptric power range.
3. S may be a variable value designed to provide a useful $Dyt$ value for a given dioptric power range.

In choosing the rear surface lens curve for the most plus dioptric lens power ($D2xt$):

1. $D2xt$ may be fixed at a chosen constant value.
2. $D2xt$ may be chosen variably, designed to provide Best-Form peripheral lens dioptric values for a given dioptric power range.

In choosing the rear surface of lens curve for the least plus dioptric lens power $D2nt$:

1. $D2nt$ may be fixed to a chosen constant value.
2. $D2nt$ may be a chosen variable designed to provide Best-Form peripheral lens dioptric values for a given dioptric power range.

Any of these selections for the factor S may be used with any of the selections for the rear surface lens curve $D2xt$ or $D2nt$ to provide an iseikonic lens set. There are, therefore, at least twelve combinations here available. The use of a variable S factor value designed to provide a useful $Dyt$ value for a given dioptric power range with a $D2xt$ or $D2nt$ factor chosen variable and designed to provide Best-Form peripheral lens dioptric values for a given dioptric power range seems to provide adequate Best-Form and lens diameter application.

The lens series obtained by using the choice of numbers 2 S and 2 $D2xt$ above is given hereinafter as Table IV–P. This table also gives a lens series for choice 2 S and 1 $D2nt$. The lens series obtained by choice of 2 S and 1 D2xt above, which combination provides a fixed D2xt and S series is shown in Table IV–R.

Iseikonic lens set

Different methods can be used for obtaining iseikonic lens sets, or lens pairs with equal magnification in all meridians. For purposes of illustration, I prefer to use a method based on the maximum dioptric difference between the most plus and the least plus dioptric meridians being considered. One of these methods is the (−Dyt) minus dioptric power difference method, and the other is the (+Dyt) plus dioptric power difference method.

The (−Dyt) minus dioptric power difference method: The minus dioptric power differences (−Dya) of the various different meridians (4 usually) involved in any spectacle lens prescription are here measured from the given maximum plus dioptric value (Dxt) selected for that particular iseikonic lens set, allowing a selected maximum dioptric difference of (−Dyt) value.

The choice of a constant or variable value of the rear surface lens curve for the most plus dioptric lens power (D2xt) come under this (−Dyt) method.

The general formula for this method is:

$$D2a = (s)(-Dya) + D2xt$$

The (+Dyt) plus dioptric power difference method: The plus dioptric power differences (+Dya) of the various different meridians involved in any considered pair of lenses are here measured from the given minimum plus dioptric value (Dnt) selected for that particular iseikonic lens set, and allowing a selected maximum dioptric difference of (+Dyt).

The choice of a fixed or variable rear surface lens curve for the least plus dioptric lens power (D2nt) comes under this plus Dyt method.

The general formula for this method is:

$$D2a = (S)(+Dya) + D2nt$$

The two Dyt methods outlined above provide no basic difference in the final resultant data for the lens design. However, in the use of the (−Dyt) method, D2xt must be chosen and D2a is solved by the appropriate formula, while in the (+Dyt) system D2nt is chosen and D2a (which may include D2xt) is solved by a different formula. These Dyt methods provide a difference of the Dya quantity as well as of the sign, without, however, changing the final result due to the difference in the two general formulae.

Factors in common between the two Dyt methods:
Chosen factors: Dxt, Dnt, Dyt, S, D2nt or D2xt, "B-F."
Given factors: Dx, Dn, D'x, D'n, h, h', q, (u and n).
Solved factors: D2a, Tm, d, M, D1a.

The S factor in combination with a D2t (either D2xt or D2nt) which must be chosen determines the shape, that is the thickness and curvature characteristics, of the particular iseikonic lens set. The front surface curve value (D1xt or D1nt) can be chosen instead of the rear surface curve value (D2xt or D2nt), but the choice of the rear surface curve values have certain advantages in simplifying the use of the formulae.

In the computing of the iseikonic lens set, the Best-Form peripheral lens function characteristics are preferably provided by dioptric values (Da) which approach the median dioptric value of the particular lens set, that is Dc=(Dxt+Dnt)/2. The outer limits of the set are left for dioptric values which have a large difference (Dya) where Best-Form must be sacrificed in the interest of equal magnification. Thickness (d), through the factor S is a variable within the limits needed by a particular desired lens diameter, and it assists the maintenance of Best-Form lenses. When large dioptric value differences (Dya) are to be considered, a smaller S factor which provides an increased thickness (d) can be used for a separate iseikonic lens set covering a similar, though larger dioptric range, to give better peripheral lens function through the lens curves provided at the extremes of the lens set dioptric power values. If very curved lenses are considered, some design, such as the "myodisc" lenses with very small lens effective diameters can be used.

The formulae given herein handle only axial lens properties. My Best-Form concept is patterned after the Tscherning ellipse and is modified therefrom to allow a given lens set to provide for its median lens values the Best-Form lens, while the outer limit lens sets deviate in both directions from Best-Form. In order to prevent excessive curve values, I use a lens thickness which allows larger dioptric difference values (Dyt) without sacrificing Best-Form lens curves.

The object distance (u) is considered infinite in the formulae of this specification. If the factor (u) is not equal to infinity the formulae are considerably more complicated, but they follow the same pattern as outlined herein for formulae use.

Iseikonic lens series

The lens set is a unit of the lens series. My preferred succession of lens sets is an overlapping succession to provide a closely arranged sequence of the median dioptric values. The succession of overlapping iseikonic lens sets which make up the iseikonic lens series must be made to include whatever dioptric values are likely to be encountered in lens prescriptions clinically. Steps of .25 diopter are sufficiently close for most purposes.

Magnification provided by each successive lens set is of no special importance as long as it is constant within that set for the dioptric difference (Dyt) desired. It would, of course, obviate the need for an overlapping series if all of the magnification values could be equal for all sets and all sets thus identical, but this is obviously impractical physically for more than a short range with ordinary size lenses. However, the lens series with equal magnification values for each set can be made within a fair range about a given lens dioptric power medium, especially for lenses of small diameter.

The ideal case would be to have the medium dioptric power equal zero when the magnification ratio was 1. For all plus dioptric lens series, however, all D1a surface curves would be minus and all D2a curves would be plus, thus preventing any Best-Form consideration, except modification by increasing the thickness factor (d) to reduce the curves to a minimum.

Rear surface lens curve relations

It should be noted that in the formulae:

$$D2nt = (-Dyt) + D2xt$$

and $D2xt = S(+Dyt) + D2nt$, the factors S and Dyt provide a constant value, (D2yt):

$$D2yt = S(+Dyt) = D2xt - D2nt$$

This constant is important, for it defines accurately the exact difference between the rear surface curves in diopters, such that once one rear surface curve is chosen, the other one follows it according to the difference of factor D2yt. This factor, therefore, allows simple adjustment of the relative Best-Form properties of the two extreme power meridians considered for any given lens set, and may be arranged to provide the median dioptric power value lenses of any set with preferred Best-Form characteristics so that lenses with small Dya values may have Best-Form even when used with an iseikonic lens set providing for large (Dyt) values.

It is obvious, therefore, that although D2yt is a constant, the chosen D2xt or D2nt value can be constant or varied as desired. For instance, D2xt could be set equal to zero, then if S=6 and Dyt=4, D2yt then=(6)(4)=24, and if D2xt equalled zero, then D2yt=−D2nt.

Steps in making iseikonic lens series

In order to make an iseikonic lens series, a selection must first be made of the total dioptric power range (G) which the series is to include. The total dioptric power difference (Dyt) intervals of the same magnification value for each iseikonic set must then be selected. A selection of the successive dioptric power interval (Dyt) overlapped must also be made. This overlap is a dioptric sequence of the median dioptric values (Dc) of each set.

The lens series can be computed by either the plus Dyt or minus Dyt method previously described, or various other methods. The choice of particular combinations of the factor S and the lens curve factors D2xt and D2nt is made, as previously explained. The values of the factors are substituted in the formulae, as will be explained in connection with Table IV–P to provide the numerical data for the lens series. Graphical application of some of the data can be used to assist in the making of a lens series, as will be explained in the subsequent description of Figure 7.

Glasses with iseikonic lens pair

Figure 1:
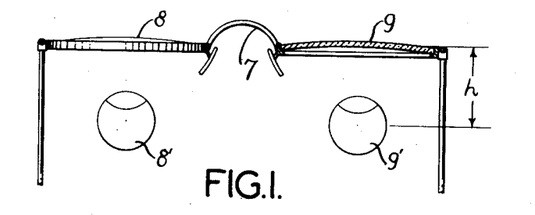
Figure 1 is a diagrammatic view, partly in section, showing spectacles embodying this invention.

Fig. 1 shows a pair of glasses or spectacles located in front of a patient's eyes. The glasses comprise a frame 7 by which lenses 8 and 9 are carried. When the glasses are worn, the left lens 8 is located in front of the left eye, indicated by the reference character 8'; and the right hand lens 9 is located in front of the wearer's right eye, indicated by the reference character 9'.

The lens 9 is shown in section so as to illustrate the front and rear surface curves, the front surface is indicated by the legend $D1a$ and the rear surface lens curve by the legend $D2a$. The intended distance from the vertex of the lens 9 to the center of rotation of the eye 9' is indicated by the dimension designation $h$. In accordance with this invention the lenses 8 and 9 have different power in at least one meridian, but produce equal magnification in all meridians.

If a patient does not require different refractive correction for his different eyes, he has no need for this invention unless he needs equal magnification to the distance glass also in bifocal or other segments of his glasses, or unless he is afflicted with aniseikonia. When the latter is the case, this invention is modified so as to produce unequal magnification of a value that substantially counteracts the unequal magnification of the patient's eyes and thus produces brain images of equal size.

Figure 2:
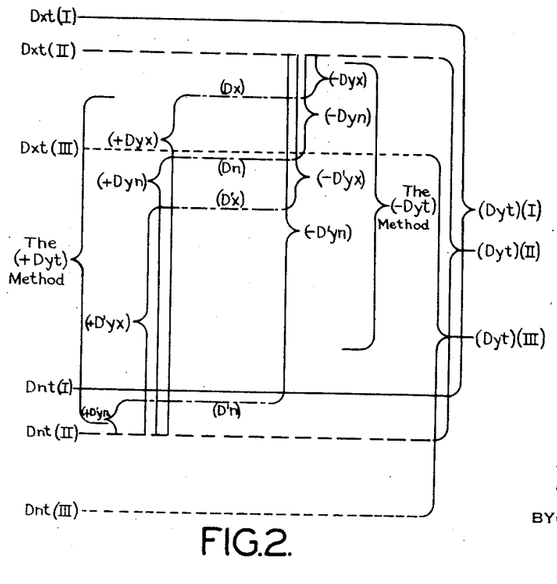
Figure 2 is a diagram illustrating the way in which lens sets of this invention are made to overlap so as to get the refractive corrections for both eyes in all meridians within the lens set having equal magnification by the lenses for all powers and all meridians in particular prescriptions.

Figure 2 illustrates a lens series having three overlapping lens sets, I; II and III. The selected total dioptric power range is from $Dxt$ (I) to $Dnt$ (III). The selected total dioptric power differences, that is, the $Dyt$ intervals for the respective sets are the differences between $Dxt$ (I) and $Dnt$ (I) for the first lens set; $Dxt$ (II) and $Dnt$ (II) for the second lens set; and $Dxt$ (III) and $Dnt$ (III) for the third set. In the drawing, the three lens sets, I, II, III embrace approximately equal $Dyt$ value intervals. This is not necessary, but is shown in the drawing for simplicity.

The magnification (M) value for each of the successive overlapping sets, I, II, III, does not have any particular absolute or mutually relative value necessarily, but it must be fixed.

The particular value of the S factor for each set may be the same or may be different, as desired, to provide Best-Form characteristics, but for simplicity in presentation I have usually shown only one S factor value in compiled data for the illustrated iseikonic lens series.

The selected successive dioptric power interval ($Dyt$) overlap in Figure 2 is the dioptric sequence of the median dioptric values ($Dc$) of each of the lens sets I, II, and III. Figure 2 shows a theoretical refractive power prescription having the $Da$ values: $Dx$, $Dn$; $D'x$ and $D'n$. It will be noted that these values fall entirely within only one lens set in Figure 2, that is, the lens set II. This lens set would, therefore, be the one used for the particular prescription. The relation of these prescription values to set II is shown according to both the plus $Dyt$ and the minus $Dyt$ methods.

The way in which the actual values are chosen for making a particular prescription iseikonic will be described below. It will be evident from Figure 2, however, that there is an infinitude of possible lens series and overlapping lens sets.

Making a given lens prescription iseikonic

A lens prescription gives the factors $Dx$, $Dn$, $D'x$ and $D'n$ as determined clinically. The distance factor ($h$) is determined by the fitting measurement, and the lens diameter ($q$) may also be included in the prescription. The prescription combines $Dx$ with $Dn$ for one eye and combines $D'x$ with $D'n$ for the opposite eye. The prescription is made iseikonic by the following steps.

1. Solve the desired median dioptric value for the prescription: $(Dxt+Dnt)/2=Dc$, to show the median dioptric value of the wanted lens set in a given lens series.

2. This particular iseikonic lens set then gives values: $Dxt$, $Dnt$, $Dyt$, $S$, $M$, and for ($-Dyt$) method gives $D2xt$, or for ($+Dyt$) method gives $D2nt$.

3. Then solve either for ($-Dyt$) method:

$$D2nt = S(-Dyt) + D2xt$$

or for ($+Dyt$) method:

$$D2xt = S(-Dyt) + D2nt$$

4. The minimum ($d$) value must be found for the most plus meridian ($Dxt$) of the set:

$$(d)(n) = (tm) = \left(\frac{1-\sqrt{1-q^2Kxt^2}}{2Kxt}\right) + \left(\frac{1-\sqrt{1-q^2D2xt^2}}{2D2xt}\right)$$

5. Then check iseikonic series value factor (S) to be sure to include the minimum $d$ value needed, the given $h$ values and the M value for the set. (If S should not do this, a different series would have to be used.)

6. Solve R: $R=(S-1)/(h)$.

If the distance from the vertex of the lens to the center of rotation of the eye is not the same for both eyes, then the distance for the second eye is represented by the factor ($h'$) and it is necessary to also solve for R' in the following formula:

$$R' = (S-1)/h'$$

7. Solve $d$ (actual, and not just the minimum, needed as above):

$$(d) = (M)/(R); \quad (d') = (M)/(R')$$

8. Find ($Dya$) values for lens prescription dioptric powers:

By ($-Dyt$) method:
  $-Dyx = Dx - Dxt$
  $-Dyn = Dn - Dxt$
  $-D'yx = D'x - Dxt$
  $-D'yn = D'n - Dxt$
or by ($+Dyt$) method:
  $+Dyx = Dx - Dnt$
  $+Dyn = Dn - Dnt$
  $+D'yx = D'x - Dnt$
  $+D'yn = D'n - Dnt$ 9. Solve ($D2a$) values for all dioptric powers of the given lens prescription by substituting into:

By ($-Dyt$) method:
  general formula is:

$$D2a = S(-Dya) + D2xt$$

whence:
  $D2x = S(-Dyx) + D2xt$
  $D2n = S(-Dyn) + D2xt$
  $D'2x = S(-D'yx) + D2xt$
  $D'2n = S(-D'yn) + D2xt$ or by ($+Dyt$) method:
  general formula is:

$$D2a = S(+Dya) + D2nt$$

whence:
  $D2x = S(Dyx) + D2nt$
  $D2n = S(Dyn) + D2nt$
  $D'2x = S(D'yx) + D2nt$
  $D'2n = S(D'yn) + D2nt$ 10. Solve the respective ($D1a$) values (is same for both $Dyt$ methods).

General formula:

$$D1a = \left(\frac{Da - D2a}{1 + d(Da - D2a)}\right)$$

whence:

$$D1x = \frac{Dx - D2x}{1 + d(Dx - D2x)}$$

$$D1n = \frac{Dn - D2n}{1 + d(Dn - D2n)}$$

$$D'1x = \frac{D'x - D'2x}{1 + d(D'x - D'2x)}$$

$$D'1n = \frac{D'n - D'2n}{1 + d(D'n - D'2n)}$$

Graphs to assist selections of iseikonic lens sets and series

Figure 7:
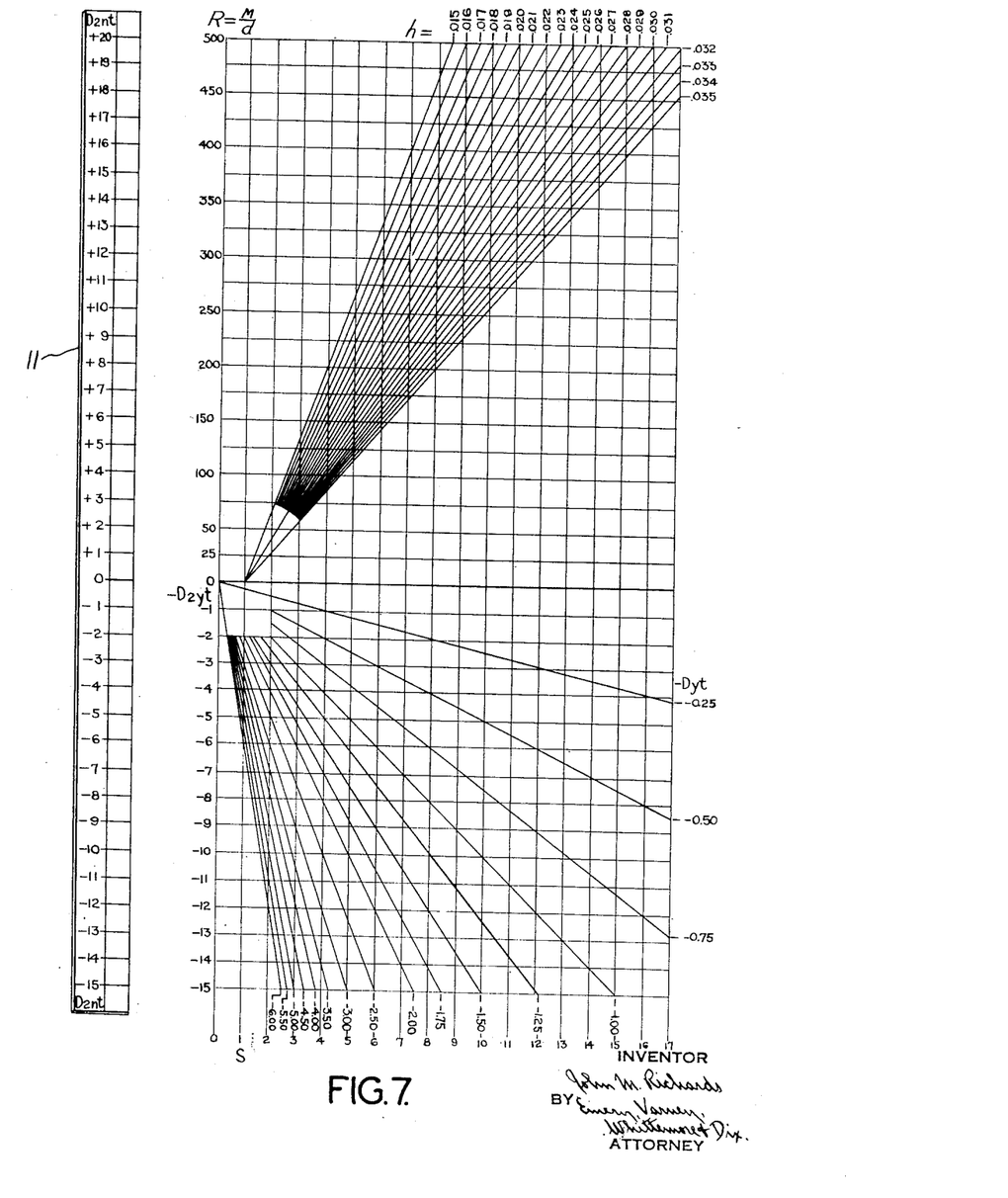
Figure 7 is a chart with a movable slide that can be used for making any lens prescription iseikonic.

Figure 7 shows two graphs combined with a slide scale, and this apparatus can be used to assist in the selection of both the lens sets and the lens series. The graphical representation is limited to the minus $Dyt$ method but can be readily applied to the plus D$yt$ method, or other methods. Numerous graphs can be worked out, but Figure 7 is believed to be sufficient to illustrate this selector feature of the invention. Two graphs are used, one for the equation $S=(hR+1)$ and the other for the equation $(-D2yt)=(S)(-Dyt)$. A sliding scale 11 is used with the second graph to show and
$$D2a=S(-Dya)+D2xt$$
$$D2nt=S(-Dyt)+D2xt$$

for a lens set, all deriving from:

$$-D2ya=D2a-D2xt=S(-Dya)$$

for any power.

The top graph of Fig. 7 is arranged to provide (S) as the abscissa. It allows simple variation of (R) according to ($h$) and (S) to allow in turn for different ($h$) values especially. This is illustrative, therefore, of the effect of a change in ($h$) and demonstrates readily that for a given (S) value and for a given (M) value, as ($h$) changes, (R) must also change, and this change obviously here occurs in ($d$). Other interrelations can as easily be demonstrated by consideration of the formula and its graph.

This graph thus can be used to assist in adequate selection of a desirable (S) value for a lens series, and is especially useful in correlation with the bottom graph of Fig. 7, the graph of $(-D2yt)=S(-Dyt)$, for which use it has been orientated.

This bottom graph, according to the $(-Dyt)$ method, provides use of the chosen factors (S) and $(-Dyt)$ to find (D2$yt$) which is the difference between (D2$xt$) and (D2$nt$). Thus, $$D2yt=D2xt-D2nt$$

and by the $(-Dyt)$ method, D2$xt$ is always chosen, allowing thence a simple solution for (D2$nt$). This solution can be done by calculation very simply or with the sliding scale 11 to find D2$nt$ in the units of the (D2$yt$) scale. This sliding scale is used by letting (D2$yt$=0) be the index at which the (D2$xt$) value chosen is placed opposite on the D2$nt$ sliding scale, and then according to the intersection of the chosen (S) value coordinate with the chosen $(-Dyt)$ line slope, the ordinate (or "y-axis" coordinate) value of D2$nt$ is read from the sliding D2$nt$ scale localized there.

It is well to note that this graph is useful to determine preferred (D2$xt$) and (D2$nt$) relative values to provide preferred (D2$xt$) and (D2$nt$) curves of Best-Form lenses—especially for median values such as $(-Dyt/2)$, for a given iseikonic lens set. Such Best-Form, of course, varies with the D$xt$ value also and thus is not the same for each set.

This graph, however, is not limited to such use, and may be used to solve the rear surface curves (D2$a$) for any lens prescription, once a given iseikonic lens set encompassing its dioptric values has been selected from a given possible iseikonic lens series. This is done by considering the $(-Dyt)$ values as $(-Dya)$ and (D2$nt$) as (D2$a$). Thus, the formula becomes:

$$((+D2a=S(-Dya)+D2xt))$$

The sliding scale can be used, also, similarwise.

Other iseikonic lens series can be devised, for example, based upon a given D$yt$ value with the S value chosen differently for each iseikonic lens set to provide Best-Form characteristics; or based upon a Best-Form chosen curve of the lens surface or upon the minimum thickness needed for a given lens diameter, the R value being calculated and the S value following according to the value of ($h$); or based upon a variable ($d$) chosen to maintain (M) and ($k$) and fixed values of (D2$x$), (D2$m$) and ($t$) for a lens set.

The equations $D2yt=S(Dyt)=(D2xt)-(D2nt)$ express the main essential relations from which the lens series are evolved.

*Use of graphs of Figure 7*

The graphs of Figure 7 can be used to make a given lens prescription iseikonic by following the steps set out below. The given values are $h$, $h'$, and $q$ and D$x$ combined with D$n$ in the 90° opposite meridian of one eye, and D'$x$ combined with D'$n$ in the 90° opposite meridian in the other eye.

The first step is to determine the iseikonic lens set desired by finding its median dioptric value from the extreme dioptric value average of the given lens prescription.

$$[(Dx+(Dn \text{ or } D'n)]/2=Dc$$

This particular desired iseikonic lens set then must have chosen (and could take from a "lens series"):

$$Dxt, Dnt, -Dyt, D2xt, S \text{ and } M$$

Note the minimum ($d$) value for this chosen lens set: (either graphical or tabulated data could be used here)—
Formula:

$$(d)(n)=(tm)=\frac{1-\sqrt{1-q^2Kxt^2}}{2Kxt}+\frac{1-\sqrt{1-q^2D2xt^2}}{2D2xt}$$

Check (M)/($d$ minimum) value against $h$ value on the top graph in Fig. 7 to be sure S is adequate for $d$ minimum.

Solve $D2nt=D2xt-D2yt$ using the sliding scale for D2$nt$ with graph of $(D2nt)=S(-Dyt)+D2xt$, which is the bottom graph in Fig. 7.

Check S value of the lens set on the bottom graph to be sure it includes the $(-Dyt)$ value by locating the $(-D2nt)$ value on the sliding D2$nt$ scale 11 and noting the S value in line on the abscissa scale opposite its intersection with the appropriate $(-Dyt)$ line.

Locate corresponding R value on the top graph, from the intersection of S coordinate value with $h$ line slope.

Solve $d=(M/R)$. A graph for this can be constructed.

Locate $(-D2ya)$ value on the $(-D2yt)$ scale for each (D$ya$) value of the lens prescription by finding on this scale the value corresponding to the intersection point of the S value with the appropriate D$ya$ line slope value.

Solve (D2$a$) value for each (D$ya$) value by:

$$D2a=D2xt-D2ya$$

or solve graphically by use of a sliding scale for D2$nt$ for different values of D2$xt$ to be substituted for the $(-D2yt)$ scale.

Solve respective D1$a$ value as by formula:

$$D1a=\frac{Da-D2a}{1+d(Da-D2a)}$$

or use tabulated data, or use graphs as desired.

The graphs can be used to select an iseikonic lens series. The iseikonic lens series selection (sequence of lens sets—overlapping or otherwise) depends upon how closely successive median iseikonic lens set values providing Best-Form lens properties peripherally are desired. Such a choice determines the sequence of the D$nt$ and D$xt$ values respectively of each successive iseikonic lens set, and the use of the graphs follows this pattern accordingly in the manner described in the use and selection of an iseikonic lens set above. Note that once the median iseikonic lens set values sequence is determined, then the choice of the D$yt$ value for each set determines the amount of "overlapping" of successive sets.

*Tables of iseikonic lens series*

The Table IV-P shows an iseikonic lens series for Best-Form (D2$nt$), computed by the $+Dyt$ method. The chosen factors include D$yt$=4 diopters; $S$=6; $R$=200 and $h$=0.025 meters. The lens diameter ($q$) is not considered except by choice of S and is adequate here for a lens diameter of 50 millimeters up to a +13.00 diopter power of D$nt$, approximately. The tables shows variations from a D$yt$ range from +8 to −8, but the table can be extended in both directions and smaller steps are used in practice, this table and the subsequent Table IV-R being merely illustrative.

Successive M value overlapping iseikonic lens sets are separated arbitrarily in Table IV-P by one diopter. The median dioptric value of the set (D$c$) follow accordingly.

TABLE IV-P

| $Kmt$ | $Dnt$ | $D2nt$ | $D2nt$ [1] | $Dxt$ | $D2xt$ | $d$ | $M$ | $D1nt$ | $D1xt$ |
|---|---|---|---|---|---|---|---|---|---|
| 15 | −8 | −23 | −26 | −4 | 1 | .00444 | 0.888 | 14.08 | −5.11 |
| 16 | −7 | −23 | −25.5 | −3 | 1 | .00457 | 0.914 | 14.90 | −4.07 |
| 16 | −6 | −22 | −25 | −2 | 2 | .00467 | 0.934 | 14.90 | −4.07 |
| 17 | −5 | −22 | −24.5 | −1 | 2 | .00481 | 0.962 | 15.70 | −3.03 |
| 17 | −4 | −21 | −24 | 0 | 3 | .00493 | 0.986 | 15.70 | −3.02 |
| 18 | −3 | −21 | −23.5 | +1 | 3 | .00508 | 1.016 | 16.50 | −2.02 |
| 18 | −2 | −20 | −23 | +2 | 4 | .00521 | 1.042 | 16.50 | −2.02 |
| 18 | −1 | −19 | −22.5 | +3 | 5 | .00535 | 1.070 | 16.45 | −2.02 |
| 18 | 0 | −18 | −22 | +4 | 6 | .00459 | 1.098 | 16.40 | −2.02 |
| 19 | +1 | −18 | −21.5 | +5 | 6 | .00568 | 1.136 | 17.15 | −2.02 |
| 19 | +2 | −17 | −21 | +6 | 7 | .00585 | 1.160 | 17.12 | −1.005 |
| 19 | +3 | −16 | −20.5 | +7 | 8 | .00585 | 1.198 | 17.08 | −1.006 |
| 19 | +4 | −15 | −20 | +8 | 9 | .00599 | 1.242 | 17.02 | −1.006 |
| 19 | +5 | −14 | −19.5 | +9 | 10 | .00621 | 1.282 | 16.94 | −1.007 |
| 19 | +6 | −13 | −19 | +10 | 11 | .00641 | 1.324 | 16.90 | −1.007 |
| 18 | +7 | −11 | −18.5 | +11 | 13 | .00662 | 1.360 | 16.05 | −2.03 |
| 17 | +8 | −9 | −18 | +12 | 15 | .00699 | 1.398 | 15.20 | −3.07 |

[1] This column in the above table shows the special case where the rear surface curve is equal to one-half of $Dxt$.

Another lens series computed by the $-Dyt$ method, and for the special case where $D2xt=0$, is given in Table IV-R. Chosen factors are $D2xt=0$; $Dyt=-4$; $S=6$; $R=200$; and $h=0.025$ meter. As in the case of the Table IV-P, lens diameter ($q$) is not considered except by choice of S and in value chosen for Table IV-R, the factor S is adequate for a lens diameter of 50 millimeters up to the +17 dioptric value of $Dnt$, approximately, though only a part of the total range is shown in the table.

TABLE IV-R

| $Dxt$ | $Dnt$ | $D2nt$ | $D1nt$ | $d$ | $M$ |
|---|---|---|---|---|---|
| −10 | −14 | −24 | 10 | .00385 | .770 |
| −9 | −13 | −24 | 11 | .00394 | .788 |
| −8 | −12 | −24 | 12 | .00403 | .806 |
| −7 | −11 | −24 | 13 | .00413 | .826 |
| −6 | −10 | −24 | 14 | .00424 | .848 |
| −5 | −9 | −24 | 15 | .00435 | .870 |
| −4 | −8 | −24 | 16 | .00446 | .892 |
| −3 | −7 | −24 | 17 | .00459 | .918 |
| −2 | −6 | −24 | 18 | .00472 | .944 |
| −1 | −5 | −24 | 19 | .00485 | .970 |
| 0 | −4 | −24 | 20 | .00500 | 1.000 |
| +1 | −3 | −24 | 21 | .00516 | 1.032 |
| +2 | −2 | −24 | 22 | .00532 | 1.064 |
| +3 | −1 | −24 | 23 | .00550 | 1.100 |
| +4 | 0 | −24 | 24 | .00568 | 1.136 |
| +5 | +1 | −24 | 25 | .00588 | 1.176 |
| +6 | +2 | −24 | 26 | .00610 | 1.220 |
| +7 | +3 | −24 | 27 | .00633 | 1.266 |
| +8 | +4 | −24 | 28 | .00658 | 1.316 |
| +9 | +5 | −24 | 29 | .00685 | 1.370 |
| +10 | +6 | −24 | 30 | .00714 | 1.428 |

*Shape of iseikonic lenses*

All of the lenses considered thus far are bitorics, that is, lenses with both surfaces of toric shape, whenever the dioptric power of the lens prescription is not the same in all meridians of the same eye. There is no way of using the same piece of glass for such a lens without resorting to bitorics. If lenses other than bitorics are to be used, they must be compound lenses made by combining different pieces of glass.

The use of bitoric lenses has, however, the immense advantage that magnification values are equal in all meridians of the eye, if properly handled, for a given object distance, and they have the special advantage that there is thus no conflict between orientation of dioptric power (refractive) and magnification (eikonic) axes or meridians in attempting to balance all of the meridians in both eyes as occurs whenever power cylinder axes are not either parallel or at 90° to each other. As soon as any other system is used allowing unequal magnification in the meridians of the same or of both eyes, the distortion of the viewed image must occur and if it occurs in any except the vertical or horizontal meridians then torsion of the image of each eye occurs and unless the torsion is equal and in the same direction in both eyes, tilt will be produced. These are the phenomena which causes symptoms in patients, and towards which this invention is directed.

It will be understood that in some cases the "curve" on one surface of the lens may be plane; the term "curve" being used herein to designate the surface contour whether or not its radius of curvature is infinite.

*Bifocals*

The effective dioptric strength of a given lens varies according to the object distance ($u$), and when the power of two lenses is different this variation in effective dioptric strength is not by the same amount for different original dioptric meridional strength for different object distances. Therefore, an iseikonic lens set for one distance will not necessarily be iseikonic for another distance. The description of the invention thus far has been for only single vision prescription lenses, the formulae being worked out for an object distance of infinity. As previously explained, the iseikonic lens sets can be worked out for other distances, such as reading distance, but with different formulae corresponding to object distances not equal to infinity.

Thus when bifocal lenses are desired, the distance proportions of the lenses are made to provide an iseikonic lens set of a given magnification. The bifocal segments which are added must primarily give equal magnification in all meridians bilaterally, and preferably must give the same magnification as the distance portion of the glass. The optimum effect can obviously, therefore, be obtained from a bifocal segment or multifocal segments, all having identical magnification ratios. In addition the optical centers of these various segments should all be identical to prevent any prismatic "jump."

*Lens series blanks*

Figure 3:
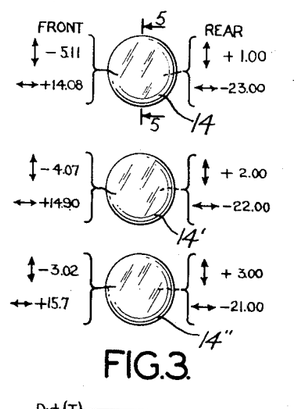
Figure 3 is a front elevation of a series of lenses made in accordance with this invention.

The iseikonic lens series is an infinitely variable consideration mathematically. An iseikonic lens series with both surfaces optically finished can be furnished. This series is inflexible, unless parallel sets are used. These factors can be used to make a completely surfaced bitoric lens stock, with overlapping magnification, if desired, which can be furnished to the optician for edging and location of the axis. However, the number of stock lenses necessary to provide for the various combinations of such a series is large, and the series is limited to one $h$ value, one $d$ value, one minimum $q$ value and one $M$ value for each lens set in the series. Bifocal consideration is another factor. Fig. 3 shows a series of lenses 14, 14', 14", there being one lens shown from three lens sets of the series set forth in Table IV-P, and both surfaces are finished. The meridian of the indicated dioptric power of the lens surfaces is designated by the arrows.

Figure 4:
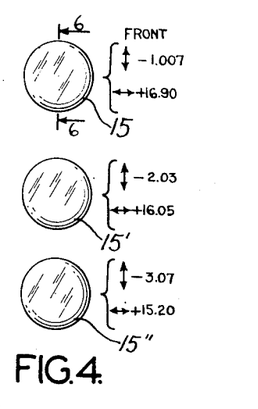
Figure 4 is a view similar to Figure 3 but showing a series of lenses having only the front surface of the lens optically ground.
Figure 5:
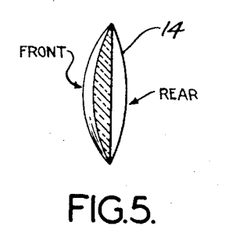
Figures 5 and 6 are sectional views taken on the lines 5—5 and 6—6 of Figures 3 and 4 respectively.
Figure 6:
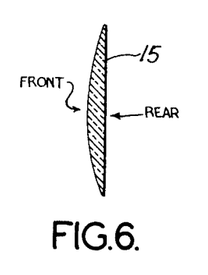

There are advantages in providing an iseikonic lens series with only one surface optically finished in both meridians. Such a lens blank series includes different combinations of rear surface curves in different meridians, leaving only the front surface to be ground with whatever lens thickness the optician selects. Instead of providing a lens blank series with optically finished rear surface curves, the lens blanks can have their front surface ground to various curves with different combinations of meridians, leaving only the rear surface curves to be ground by the optician. Fig. 4 shows a series of lenses 15, 15' and 15" with only the front surface ground. Each of these partially finished lens blanks being from a different one of the lens sets included in Table IV-P.

It will be evident that all of the possible curves for any one lens surface come within certain reasonable relative limits of $D2yt$ or $D1yt$.

The value $D2yt$ is the maximum difference between the rear surface curves, $D2xt$ and $D2nt$, of any iseikonic lens set. Thus, $(D2yt)=(D2xt-D2nt)$, and a series of lens blanks with the rear surface curves $(D2a)$ of both meridians can be supplied leaving $(d)$ and $(D1a)$ to be ground-in by the optician.

The difference in dioptric power between the most plus dioptric meridian and the least plus dioptric meridian of the rear surface lens curves allow many combinations of the other factors (S and $Dyt$), thus allowing in effect many different iseikonic lens series. This is a distinct advantage in that it often makes possible even values for the front surface lens curves that must be ground. A nomograph can be used to assist in providing the chosen variables for this purpose. Best-Form lens consideration is also more readily handled flexibly by giving different values for (S) to provide change of $(d)$ giving reasonable curve and lens thickness.

Large numbers of stock lenses can be reduced by elimination of any excessive Best-Form curves and using $(d)$ instead to make up the magnification difference.

It should be noted that one iseikonic lens series can vary from another merely by changing the absolute values of the dioptric curves without changing necessarily their relative values $(D2yt)$ or the interval difference $(E2)$.

Even values of iseikonic lens curves are advantageous because grinding forms for them are more readily available to the optician. Rear surface curves which are even numbers or which vary by 0.125 diopter in even gradations are usually preferred. The factor $(D2ya)$ is even if (S) $(Dya)$ is even. It will be evident, however, that factory ground, even rear surface curves do not insure that the optician can grind even front surface curves.

Even values for the front surface lens curves $(D1xt)$ and $(D1nt)$ are sometimes difficult to obtain. The front surface lens curve $$D1a = \frac{(Da-D2a)}{(1+d(Da-D2a))}$$

From this equation it can be seen that $D1a$ is even if the the following factors are even; $Da$, $D2a$, and $$((1+d(Da-D2a)))$$

Since $D1a$ depends upon the lens thickness $(d)$, this factor can be varied for an individual prescription iseikonic pair by changing the S factor.

Even where it is feasible to vary the magnification of a given iseikonic lens set to provide an iseikonic lens pair with one meridian front surface an even number for easy grinding, it is quite unlikely, because of the small numerical value of the lens thickness factor $(d)$ that the other three meridians can be so handled. The only easy approach is by a nomograph which can be supplied to the optician for making his iseikonic lens pair front surfaces readily ground for the individual prescription.

Blanks can also be supplied with only one surface ground and with the successive blanks having graduated refractive power in only one meridian.

The preferred embodiments of this invention have been described but changes and modifications can be made, and some features can be used alone or in different combinations without departing from the invention as defined in the claims.

I claim as my invention:

1. A pair of ophthalmic lenses at least one of which has a refractive power in at least one meridian different from the refractive power in at least one meridian of the other lens, but with the value of $$(1+d(Da-D2a))/(1-hDa)$$

the same in both meridians of both lenses, whereby angular magnification is equal in all meridians where $d=$lens thickness in meters divided by the index of refraction of the glass $Da=$dioptric lens power
$D2a=$rear surface lens curve in diopters
$h=$intended distance in meters from the vertex of the lens to the center of rotation of the eye.

2. A pair of lenses for correcting refractive errors of the eyes where the refractive error is different in the right and left eye, the rear surface curve of the least plus dioptric lens power being equal to $(d+Mh)/(d)$ $(-Dyt)+(D2xt)$; and the rear surface curve of the most plus dioptric lens power being equal to $$(d+Mh)/(d) \ (+Dyt)+(D2nt)$$

where $d$ represents the thickness of the lens in meters divided by the index of refraction of the medium from which the lens is made, M represents the angular magnification, $h$ represents the intended distance in meters from the vertex of the lens to the center of rotation of the eye, $Dyt$ represents the maximum dioptric difference measured from the most plus to the least plus dioptric meridians of the lens pair, $D2xt$ represents the rear surface lens curve of the most plus dioptric lens power, and $D2nt$ represents the rear surface lens curve of the least plus dioptric lens power, both of said lenses having front and rear surface curves and thicknesses that produce a total magnification that is equal in both lenses and substantially the same in all meridians.

3. A pair of lenses of different refractive power for the right and left eye, both of the lenses having a rear surface lens curve for each meridian equal to $$((d+Mh)/(d)) \ (-Dya)+D2xt$$

where $d$ equals the thickness of the lens in meters divided by the index of refraction of the medium from which the lenses are made, M equals the angular magnification, and $h$ represents the intended distance in meters from the vertex of the lens to the center of rotation of the eye, $(-Dya)$ represents the minus dioptric power difference of each particular meridian of the pair of lenses measured from the most plus dioptric power meridian of the pair of lenses, and $D2xt$ represents the rear surface lens curve for the most plus dioptric power meridian of the pair of lenses, both of said lenses having front and rear surface curves and thicknesses that produce a total magnification that is equal in both lenses and substantially the same in all meridians.

4. A pair of lenses of different refractive power for the right and left eye, both of the lenses having a rear surface lens curve for each meridian equal to $$((d+Mh)/(d)) \ (+Dya)+D2nt$$

where $d$ equals thickness of the lens in meters divided by the index of refraction of the medium from which the lenses are made, M equals the angular magnification, and $h$ represents the intended distance in meters from the vertex of the lens to the center of rotation of the eye, $(+Dya)$ represents the plus dioptric power difference of each particular meridian measured from the least plus dioptric power meridian of the pair of lenses, and $D2nt$ represents the rear surface lens curve of the least plus dioptric lens power of the pair of lenses, both of said lenses having front and rear surface curves and thicknesses that produce a total magnification that is equal in both lenses and substantially the same in all meridians.

5. An iseikonic lens set comprising three or more lenses with successive lenses of the set having their refractive power in at least one meridian different from the next successive lens by predetermined values, and with all lenses of the set having the value of $$(1+d(Da-D2a))/(1-hDa)$$

the same in all meridians of all the lenses, whereby angular magnification is substantially equal in all meridians of all the lenses, and where $d=$lens thickness in meters divided by the index of refraction of the lens medium
$Da=$dioptric lens power
$D2a=$rear surface lens curve in diopters
$h=$intended distance in meters from the vertex of the lens to the center of rotation of the eye.

6. A lens series comprising sets of lenses of overlapping power ranges, the rear surface lens curves of each set corresponding to the general formula $$D2a = ((d+Mh)/(d))(-Dya) + D2xt$$

where $D2a$ represents any rear surface lens curve of the lens set in diopters, $d$ represents the thickness of the lens in meters divided by the index of refraction of the glass from which the lenses are made, $M$ represents the angular magnification, $h$ represents the intended distance in meters from the vertex of the lens to the center of rotation of the eye, $Dya$ represents the plus dioptric meridional difference of all the meridians of the lens measured from the least plus dioptric power of the lens, and $D2xt$ represents the rear surface lens curve for the most plus dioptric lens power of the lenses of the set; and the rear surface lens curves of each lens of each set producing with the front surface lens curve of the other lenses of the set substantially equal magnification in all meridians for all lenses of each set.

7. An iseikonic lens series including a succession of lens sets covering overlapping successive power ranges, each lens set having rear surface lens curves of each lens of the set corresponding to the equations $$(D2a) = [(d+Mh)/(d)](-Dya) + (D2xt)$$

$$(D2a) = [(D+Mh)/(d)](Dya) + (D2nt)$$

where $d$ represents the thickness of the lens in meters divided by the index of refraction of the glass from which the lenses are made, $M$ represents the angular magnification, $h$ represents the intended distance in meters from the vertex of the lens to the center of rotation of the eye, $(-Dya)$ represents the dioptric difference between the most plus dioptric meridian of the set and the dioptric power of the particular lens power meridian being considered in the lens set, $(D2xt)$ represents the rear surface lens curve for the most plus dioptric lens power of the lens set, $D2nt$ represents the rear surface lens curve of the least plus dioptric lens power of all meridians of the lens set, and the front and rear surface lens curves of each lens combining to produce a predetermined magnification that is substantially equal in all meridians and equal to that of the other lenses of the same set.

8. An iseikonic lens series comprising a succession of lens sets with the power of each lens of a set different from the power of the other lens of the same set in at least one meridian, and with each set of lenses embracing a different range of power from each successive lens set, all of the lenses of each set having the value of $$(1+d(Da-D2a))/(1-hDa)$$

the same in all meridians of all the lenses of each set; and where $d$ = lens thickness in meters divided by the index of refraction of the lens medium
$Da$ = dioptric lens power
$D2a$ = rear surface lens curve in diopters
$h$ = intended distance in meters from the vertex of the lens to the center of rotation of the eye.

9. A series of lens blanks with each blank having the front side finished and the other side unfinished, said series including a plurality of sets of lens blanks and each set of lens blanks having groups of blanks on which the finished surface is of the same power in one meridian for each blank of the group, but different in the 90° opposite meridian according to graduated steps, and each lens blank of each set being of sufficient thickness to maintain equal magnification in all meridians for all lenses of the set when the rear surface of the blank is finished to give the lens a selected power within a predetermined range of power for the set, which range of each set overlaps the range of the next successive set of the series, and in which the front surface curves of each lens of each set is equal to $$(Da-D2a)/(1+d(Da-D2a))$$

where $Da$ is the total dioptric power of said selected power in a particular meridian being considered; $D2a$ is the lens curve of said rear surface in diopters for said particular meridian; $d$ is the thickness of the lens in meters, when ground to said selected power, divided by the index of refraction of the optical medium of the lens.

10. A series of lens blanks including successive sets of lens blanks of overlapping power ranges, each blank having its rear surface finished and its front surface unfinished, and each set of blanks having rear surface curves of each lens corresponding to the equations $$D2nt = [(t/n) + Mh]/\left(\frac{t}{n}\right)(-Dyt) + D2xt$$

$$D2xt = [(t/n) + Mh]/\left(\frac{t}{n}\right)(Dyt) + D2nt$$

where $t$ represents the intended thickness of the finished lens in meters, $n$ represents the index of refraction of the glass from which the lenses are made, $M$ represents the angular magnification, $h$ represents the intended distance in meters from the vertex of the finished lens to the center of rotation of the eye, $Dyt$ represents the maximum dioptric difference between the most plus and the least plus dioptric meridians of the lens, $D2xt$ represents the rear surface lens curve for the most plus dioptric lens power of the lens set, $D2nt$ represents the rear surface lens curve of the least plus dioptric lens power of all meridians of the lens set, each blank of the series being of a thickness greater than $t$ to allow for finishing of the front surface lens curve.

11. A pair of spectacle lenses in which each lens is of different refractive power from the other lens in at least one meridian, and in which the rear surface lens curves in the respective meridians conform to the general formula $D2ya = ((d+Mh)/(d))(Dya)$; where $D2ya$ represents the difference between the rear surface lens curve for the particular meridian being considered and the rear surface lens curve of the least plus dioptric power meridian of the pair of lenses, $d$ is the thickness of the lens in meters divided by the index of refraction of the medium from which the lenses are made, $M$ is the angular magnification, and $h$ is the intended distance in meters from the vertex of the lens to the center of rotation of the eye, and $Dya$ is the difference between the dioptric power of the particular meridian being considered and the power of the meridian of the lenses having the least plus dioptric power; the front and rear surface curves of both lenses being correlated so that the lenses have equal angular magnification in all meridians.

12. A pair of spectacle lenses in which each lens is of different refractive power from the other lens in at least one meridian, and in which the rear surface lens curves in the respective meridians conform to the general formula $(-D2ya) = ((d+Mh)/(d))(-Dya)$; and the front surface lens curves have the general formula $D1a = (Da-D2a)/(1+d(Da-D2a))$; where $D2ya$ represents the difference between the rear surface lens curve for the particular meridian being considered and the rear surface lens curve of the most plus dioptric power meridian of the pair of lenses, $d$ is the thickness of the lens in meters divided by the index of refraction of the glass from which the lenses are made, $M$ is the angular magnification, and $h$ is the intended distance in meters from the vertex of the lens to the center of rotation of the eye, $Dya$ is the difference between the dioptric power of the particular meridian being considered and the power of the meridian of the lenses having the most plus dioptric power, $D1a$ is the dioptric power of the front surface lens curve in the meridian being considered, $Da$ is dioptric lens power of that meridian, and $D2a$ is the dioptric power of the rear surface lens curve of the same meridian as $D1a$ and $Da$.

13. A pair of ophthalmic lenses at least one of which has a refractive power in at least one meridian different from the refractive power in at least one meridian of the other lens, with the power of the rear surface curve of each meridian of each lens equal to $S(Dya) + D2nt$, and the front surface curve of each meridian of each lens equal to $$\frac{Da-D2a}{1-d(Da-D2a)}$$

where $S$ is a complex factor comprised of $(d+Mh)/d$; $D2nt$ is a preselected rear surface curve for obtaining a predetermined power $Dnt$ in the meridian of less dioptric power; $Dya$ is the amount that a desired power $Da$ of the lens in a meridian exceeds the said preselected power $Dnt$; $Da$ is the desired power of the lens for each meridian; $D2a$ is the rear surface curve of the particular meridian being considered; $d$ is the reduced lens thickness (axial) and equals the actual thickness divided by the index of refraction of the lens medium; $M$ is the angular magnification produced by the lens; and $h$ is the intended distance in meters from the vertex of the lens to the center of rotation of the eye with which the lens is used.

References Cited in the file of this patent

UNITED STATES PATENTS

| Number | Name | Date |
|---|---|---|
| 2,023,907 | Tillyer | Dec. 10, 1935 |
| 2,077,134 | Tillyer | Apr. 13, 1937 |
| 2,087,234 | Ames et al. | July 20, 1937 |
| 2,118,132 | Ames | May 24, 1938 |
| 2,118,173 | Dittmer | May 24, 1938 |
| 2,125,056 | Tillyer | July 26, 1938 |
| 2,131,232 | Ogle | Sept. 27, 1938 |
| 2,133,589 | Sterling | Oct. 18, 1938 |
| 2,180,887 | Tillyer | Nov. 21, 1939 |
| 2,187,105 | Tillyer | Jan. 16, 1940 |
| 2,288,697 | Glazer | July 7, 1942 |